Feb. 23, 1926.
R. J. McLEAN
COMBINATION TOOL
Filed March 11, 1925
1,574,497
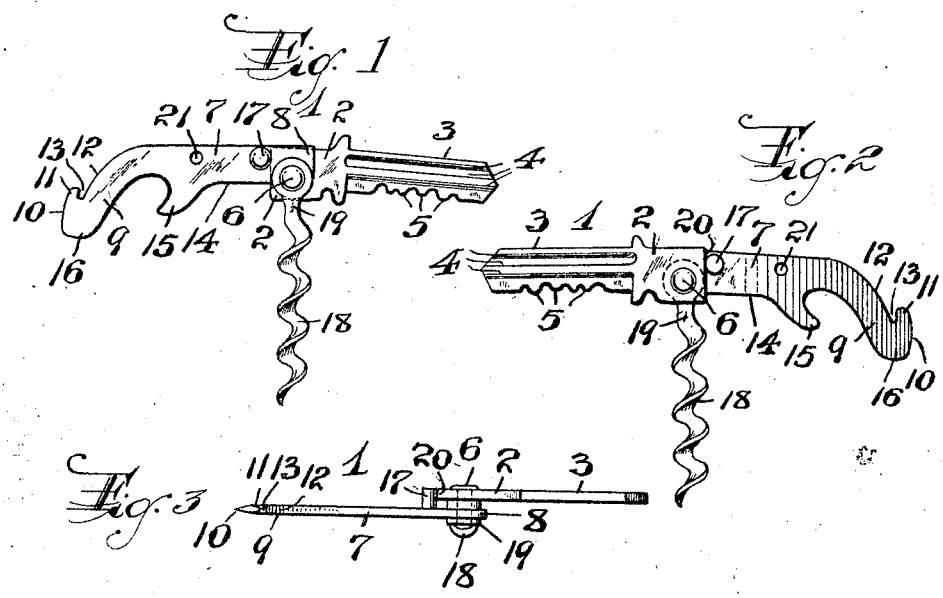
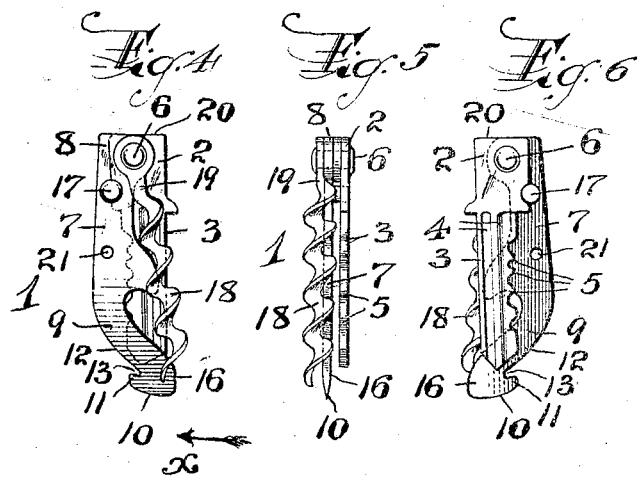
INVENTOR:
Robert J. McLean,
BY
Praentzel and Richards,
ATTORNEYS.

Patented Feb. 23, 1926.

1,574,497

UNITED STATES PATENT OFFICE.

ROBERT J. McLEAN, OF NEW YORK, N. Y., ASSIGNOR TO SLOAN & COMPANY, A CORPORATION OF NEW YORK.

COMBINATION TOOL.

Application filed March 11, 1925. Serial No. 14,592.

*To all whom it may concern:*

Be it known that I, ROBERT J. MCLEAN, a citizen of the United States, residing at New York, in the county of New York and State of New York, have invented certain new and useful Improvements in Combination Tools; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in combination tools; and, the present invention has reference, more particularly, to a novel and neat construction of ornamental implement, combining an association of pivotally and foldably connected members, in the form of a key, a box-opener, a seal-cap remover, and a corkscrew, all of which are adapted to be attached to the end of a watch-chain, and when folded may be readily and conveniently carried in the vest-pocket or the like.

The invention has for its principal object, the production of a novel, simple, neat, and ornamental implement of the general character hereinafter more fully set forth.

Other objects of the present invention not at this time more particularly enumerated will be fully understood from the following detailed description of the said invention.

With the various objects of the said invention in view, the same consists primarily, in the novel implement or tool hereinafter set forth; and the said invention consists, furthermore, in the novel arrangements and combinations of the various devices and parts, as well as in the details of the construction of the said parts, all of which will be more fully described in the following specification, and then finally embodied in the clauses of the claims which are appended to and which form an essential part of the said specification.

The invention is fully illustrated in the accompanying drawings, in which:—

Figs. 1 and 2 are the two side views, and Fig. 3 a top-edge view of the implement, with the various members of the device shown in their extended relation, ready for use;

Fig. 4 is a side view of the members of the implement in their closed or folded relation; Fig. 5 is a side-edge view of the same, looking in the direction of the arrow *x* in Fig. 4; and Fig. 6 is a view of the reverse side of the implement, with the members thereof shown in their closed or folded relation.

Similar characters of reference are employed in all of the said above-described views, to indicate corresponding parts.

Referring now to the several figures of the drawings, the reference character 1 indicates the complete implement or tool, the same comprising a main shank 2 from which extends a member or element 3, the faces of which are provided with longitudinally extending flutings, as 4, and one of the edges of which is made with suitable serrations, as 5, so as to provide a key-member of any usual shape for operating the tumblers of a lock mechanism.

At a suitable point the shank 2 is provided with a pivot post or stud 6, upon which is pivotally mounted the end-portion 8 of a member 7. The free end portion 9 of said member 7 is suitably curved in a downward direction, as shown, the edge-portion 10 of which may be suitably thinned down, for insertion beneath the nailed cover of a cigar-box, or for any other suitable use. A short horn or extension 11 may be provided, forming with the edge-portion 12 of the member, a nail-receiving recess 13, and all providing a suitable claw for withdrawing the tightening nail from the cover of the box, as will be evident. Extending from the lower edge 14 of the member 7 is another suitably formed horn or extension, as 15, which with the butt 16 of the curved end-portion 9 is readily applicable for removing the usual sealing cap of a bottle.

To secure these members rigidly in their extended relation shown in Figs. 1, 2, and 3 of the drawings, the member 7 is provided with a laterally projecting pin 17, or other suitable means, which will act as a stop to hold said members in an opened-out or extended relation, and to thereby permit the use of said members 7 and 3 as a pull or handle for a corkscrew 18, the shank 19 of which is also pivotally mounted upon said post or stud 6, by engagement of said stop-pin 17 with the edge 20 of the shank 2, as will be clearly evident from an inspection of Figs. 2 and 3 of the drawings. If desired, the said member 7 may also be provided with a suitably placed perforation 21 for attachment of the implement or tool to a watch-chain or the like.

The manner of bringing the various members of the implement or tool into their folded relation is clearly shown in Figs. 4, 5, and 6 of the drawings, and any further description of the operation of the device is therefore deemed unnecessary.

Of course, I am aware that some changes may be made in the general arrangements and combinations of the several devices and parts, as well as in the details of the construction of the said parts, without departing from the scope of the present invention as set forth in the foregoing specification. Hence, I do not limit my present invention to the exact arrangements and combinations of the various devices and parts as described in the said specification, nor do I confine myself to the exact details of the construction of the said parts, as illustrated in the accompanying drawings.

I claim:—

1. An implement of the character specified, comprising a shank having a member provided with means for operating a lock mechanism, a pivot-post extending laterally from said shank, a second member pivotally mounted upon said post, said second member being provided with a downwardly curving end-portion, and a stop means connected with said second-mentioned member with which the shank of the first-mentioned member is adapted to be brought into arrested engagement, to maintain said pivoted members in fixed opened-out relation so as to provide a handle.

2. An implement of the character specified, comprising a shank having a member provided with means for operating a lock mechanism, a pivot-post extending laterally from said shank, a second member pivotally mounted upon said post, said second member being provided with a downwardly curving end-portion, and a stop-pin extending laterally from said second-mentioned member with which the marginal edge of the shank of the first-mentioned member is adapted to be brought into arrested engagement, to maintain said pivoted members in fixed opened-out relation so as to provide a handle.

3. An implement of the character specified, comprising a shank having a member extending therefrom, a pivot-post extending laterally from said shank, a second member pivotally mounted upon said post, said second member being provided with a downwardly curving end-portion, and a stop means connected with said second-mentioned member with which the shank of the first-mentioned member is adapted to be brought into arrested engagement, to maintain said pivoted members in fixed opened-out relation so as to provide a handle, combined with a helically formed member having a shank also pivotally mounted upon said pivot-post.

4. An implement of the character specified, comprising a shank having a member extending therefrom, a pivot-post extending laterally from said shank, a second member pivotally mounted upon said post, said second member being provided with a downwardly curving end-portion, a stop-pin extending laterally from said second-mentioned member with which the marginal edge of the shank of the first-mentioned member is adapted to be brought into arrested engagement, to maintain said pivoted members in fixed opened-out relation so as to provide a handle, combined with a helically formed member having a shank also pivotally mounted upon said pivot-post.

In testimony, that I claim the invention set forth above I have hereunto set my hand this 6th day of March, 1925.

ROBERT J. McLEAN.